May 24, 1960
C. L. EMMERICH
2,937,532
DIGITAL GYROSCOPE TORQUER
Filed March 31, 1958
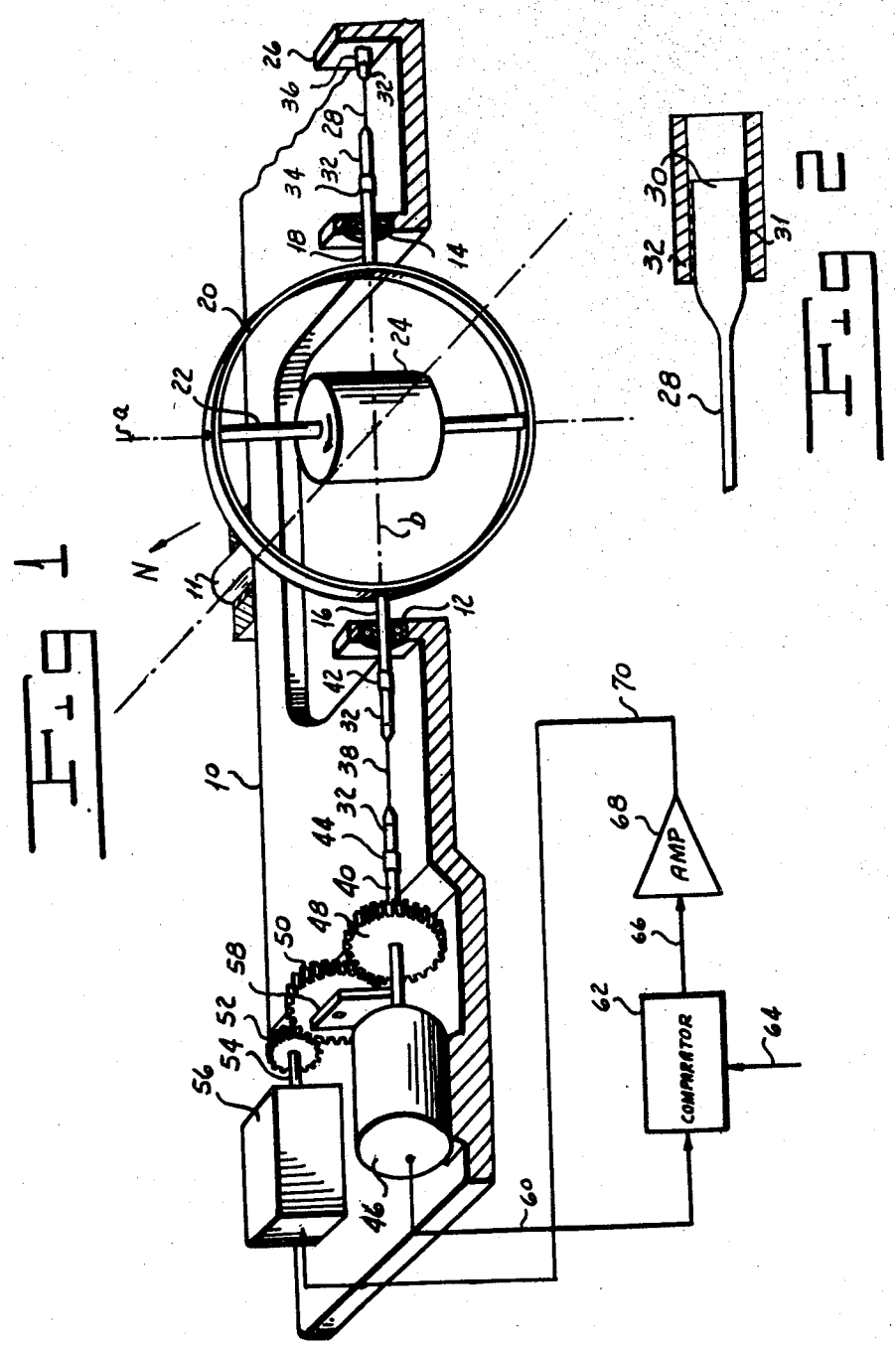
INVENTOR
CLAUDE L. EMMERICH
BY
ATTORNEY United States Patent Office 2,937,532
Patented May 24, 1960

2,937,532
DIGITAL GYROSCOPE TORQUER

Claude L. Emmerich, Tarrytown, N.Y., assignor, by mesne assignments, to United Aircraft Corporation, East Hartford, Conn., a corporation of Delaware Filed Mar. 31, 1958, Ser. No. 725,302

10 Claims. (Cl. 74—5.4)

My invention relates to a digital gyroscope torquer and more particularly to a gyroscope torquer which is capable of employing digital information to produce a torque with an accuracy consistent with the accuracy of the digital representation supplied to the torquer.

In use of gyroscopes of the prior art, the gyroscope assembly is subjected to disturbing influences which introduce errors into the gyroscope unless they are compensated for by correcting precessional torques applied to the gyroscope. For example, the rotation of the earth in effect causes the spin axis of the gyroscope to tilt with respect to a line drawn between the gyroscope and the center of the earth. If accurate indications of directions on the earth's surface are to be obtained from the gyroscope assembly, it is necessary that correcting torques be applied to the assembly in order to compensate for inaccuracies which would otherwise be introduced owing to the action of disturbing influences, such as rotation of the earth about its axis.

Further sources of disturbing effects are to be found in the motion of the aircraft or the like carrying the gyroscope. Owing to the curvature of the earth's surface, a change in direction of the horizontal plane occurs as the vehicle moves over the surface of the earth. This disturbance must be compensated for by applying correcting torques to the gyroscope assembly in applications requiring the gyroscope assembly to retain a horizontal attitude.

The precession rate which must be produced to compensate for the effect of a disturbance may be calculated by the use of digital computation with a high degree of accuracy. Recent advances in the art of digital computation have made these accurate calculations possible. For accurate results it is necessary that the compensating device produce a precession rate which is as accurate as is the rate calculated by digital computation.

As is known in the art the rate of precession of a gyroscope is equal to the product of the input torque and the angular momentum of the rotor. The latter quantity can be regulated to better than one part in a million with crystal-controlled hysteresis motor drives. Thus, insofar as rotor momentum is concerned, correcting precession rates as accurate as the digitally computed rate can be produced. It remains, however, to provide a torquer which is capable of producing a torque as accurate as the torque corresponding to the calculated, required correction rate. In the prior art magnetic means have been employed to generate correcting torques to compensate for the effect of a change in latitude and the like. These magnetic means, however, have hysteresis with the result that they are unable to produce torques with a sufficient degree of accuracy to take advantage of the accuracy of digital computation of the precession rate required for correction.

I have invented a digital gyroscope torquer which is capable of generating a torque with an accuracy equal to the accuracy of the required torque corresponding to the digitally computed precession rate. My torquer is adapted to produce an accurate torque in response to a digital representation of the required correcting torque fed to the torquer. My torquer produces a much more accurate correcting torque than do torquing devices known in the prior art.

One object of my invention is to provide a digital gyroscope torquer which produces a torque with an accuracy comparable to the accuracy of the digitally computed representation of the required correcting torque.

Another object of my invention is to provide a digital gyroscope torquer which produces a more accurate torque than do torquing devices of the prior art.

A further object of my invention is to provide a digital gyroscope torquer which produces an accurate torque in response to a digitally computed representation of torque fed to my torquer.

A still further object of my invention is to provide a digital gyroscope torquer having substantially no hysteresis.

Other and further objects of my invention will appear from the following description.

In general my invention contemplates the provision of a digital gyroscope torquer for a gyroscope float having a pair of pivot shafts by means of which the float is supported on a platform or Cardan ring. A fixed torsion wire is connected between one of the float pivot shafts and a support carried by the platform. I apply a precessing torque to the float by twisting a movable torsion wire connected between a drive means and the other one of the float pivot shafts. The fixed torsion wire does not exert any torque upon the float because the float angle is maintained at a very small value by means of the gimbal servomotor drives usually employed in gyroscope assemblies of the prior art as is known to the prior art. An analogue-to-digital converter driven by the movable wire drive produces a digital output which I feed to a comparator which compares the converter output with a digital representation of the computed torque to porduce an analogue error signal for energizing the movable wire drive. By feeding a digital representation of the computed torque to the comparator I twist the movable torsion fiber torque a number of turns which is proportional to the required torque. I form the torsion fibers or wires of my system from a material having substantially no mechanical hysteresis, such as fresh silica, or quartz, and form them of very fine diameter so that a large number of turns will produce a small torque.

In the accompanying drawings which form part of the instant specification and which are to be read in conjunction therewith and in which like reference numerals are used to indicate like parts in the various views:

Figure 1 is a schematic view of my digital gyroscope torquer.

Figure 2 is a fragmentary, sectional view of one of the torsion fibers of my torquer.

Referring now more particularly to the drawings, the gyroscope assembly with which my torquer is used includes a platform or Cardan ring 10 rotatably mounted on shafts 11 and carrying a pair of bearings 12 and 14 which rotatably support the pivot shafts 16 and 18 of the gyroscope housing or float represented by ring 20. The ring or float 20 rotatably supports the shaft 22 of the rotor 24 of the gyroscope. From the structure thus far described it will be appreciated that the axis $a$ of shaft 22 defines the spin axis of the gyroscope while the common axis of stub shafts 16 and 18 which extends at right angles to the axis $a$ forms an axis $b$ about which torques are to be applied.

I connect shaft 18 to a support bracket 26 formed on the gimbal 10 by means of a fixed torsion wire 28. I form the wire 28 from a material such, for example, as quartz having substantially no mechanical hysteresis. The wire 28 may have a thickness of, for example, two and one half mils. In order to secure the ends of wire or fiber 28 respectively to the shaft 18 and to bracket 26 without affecting the mechanical properties of the torsion wire, the fiber 28 is formed by softening a piece of solid quartz 30, for example ⅛ inch in diameter, and drawing the fiber 28 from it. The quartz rod 30 is then cemented in a metal tube 32 with an adhesive 31 such as an epoxy resin. Respective collets 34 and 36 connect the tubes 32 into which the ends of fiber 28 are cemented respectively to shaft 18 and to the support bracket 26.

I secure a movable torsion fiber 38 formed of a material such as quartz having substantially no mechanical hysteresis between shaft 16 and a shaft 40 adapted to be driven in a manner to be described to twist fiber 38 to apply a torque to the ring or float 20. The fiber 38 is cemented into respective tubes 32 and the tubes 32 are connected respectively to shaft 16 and to shaft 40 by collets 42 and 44. It is to be understood that fibers 28 and 38 are substantially coaxial with the axis of rotation of ring 20.

As is known in the art, the twist produced in a quartz fiber by a given turning movement is accurately proportional to the moment and is independent of the previous twists to which the fiber has been subjected. In other words, the quartz fiber has substantially no mechanical hysteresis. In order to apply a torque to the float 20 I drive shaft 40 to twist wire 38 through a number of revolutions which will give the required torque. For example, if I employ a quartz fiber 38 having a length of approximately one inch and a diameter of about two and one-half mils and twist the wire through ten revolutions, it will exert a torque of over a thousand dyne-centimeters. This torque is adequate to accomplish stabilization with respect to, for example, the angular velocity of the earth in a gyroscope assembly using a rotor whose angular momentum is over ten million gram-cm.$^2$ per second.

My torquer includes a motor 56 carried by the platform 10 which drives a pinion 52 carried by the motor shaft 54 for rotation with the shaft. Pinion 52 drives a gear 50 rotatably supported on a bearing support plate 58. Gear 50 drives a pinion 48 carried by shaft 40 for rotation with the shaft to drive shaft 40. Shaft 40 is coupled by any convenient means known to the art to the input shaft of an analogue-to-digital converter 46. The analogue-to-digital converter 46 may be of any type known to the art. Preferably I employ an analogue-to-digital converter such as is disclosed in the copending application of Jack B. Speller, Serial No. 464,774, filed October 26, 1954, now Patent No. 2,873,440.

As motor 56 drives the gear train including gears 52, 50 and 48 to drive shaft 40 to twist wire 38, shaft 40 drives converter 46. The converter 46 produces a binary digital representation of the rotation of the shaft 40. An output channel 60 conducts the binary digital representation produced by the converter 46 to one input channel of a comparator and digital-to-analogue converter 62. The converter 62 may, for example, be the type shown in the copending application of Charles A. Krause et al., Serial No. 716,170, filed February 19, 1958, for a Digital Comparator. A second channel 64 conducts a binary digital representation of the required correcting torque from a storage register or the like (not shown) to a second input channel of comparator and converter 62. The comparator and converter 62 compares the two binary digital representations carried by the respective channels 60 and 64 and produces an analogue output signal having a magnitude proportional to the difference between the two digital inputs and a polarity representing the direction of this difference. Such comparators may take many forms and are well known in the art. An output channel 66 applies the analogue output signal from comparator 62 to an amplifier 68, the output channel 70 of which applies the amplified output of comparator 62 to motor 56.

In operation of my digital gyroscope torquer let us assume that the shafts 16 and 18 support the roll gyroscope ring or float 20 and that the rotor 24 is spinning in a clockwise direction as viewed from the top in Figure 1. Let us also assume that the craft such as an aircraft or the like carrying the gyroscope assembly is heading due north at the equator in straight, level flight as is indicated by the arrow N in the figure. The earth is rotating from west to east at a speed of 900 nautical miles per hour at the equator. Since the spin axis of rotor 24 tends to remain stationary in space and since the aircraft is carried along with the earth this motion of the earth in effect inclines the top of the spin axis to port. In order to compensate for this effect of motion of the earth, it is necessary to apply a torque around the axis $b$ in a counterclockwise direction as viewed from the left in Figure 1.

As has been explained hereinabove, the required correcting torque can accurately be calculated by digital computation methods known to the art. I apply the digital representation of the required correcting torque to comparator 62 to cause the comparator to produce an analogue output signal which is amplified by amplifier 68 and applied to motor 56 to drive shaft 40 through gear 52, 50 and 48 to twist wire 38 to apply the torque to the housing or float 20 in the proper direction to precess the gyroscope to compensate for the effect of motion of the earth. As shaft 40 turns, it causes the converter 46 to produce a digital representation of the number of turns through which wire 38 has been twisted. Channel 60 feeds this output from converter 46 to comparator 62. The comparator compares this representation with the representation of the calculated torque to cause the comparator to produce an output signal which represents the analogue of the difference between the actual torque applied to the ring or float 20 and the calculated torque. When the analogue signal output from comparator 62 drops to zero wire 38 has been twisted through a number of turns which is equal to the number of turns necessary to produce the required torque. As has been explained hereinabove, the quartz wire 38 has substantially no mechanical hysteresis with the result that the number of turns of shaft 40 is accurately representative of the turning moment at the shaft 16.

It will be seen that I have accomplished the objects of my invention. I have provided a digital gyroscope torquer which produces a torque with an accuracy on a level with the accuracy with which a representation of the torque may be computed by digital methods. My torquer has substantially no mechanical hysteresis. It is capable of producing a torque in response to a digital represenation of the required torque.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A gyroscope assembly including in combination a rotor, a gimbal ring supporting said rotor for movement about the rotor axis, a support, means for mounting said gimbal ring on said support for movement about an axis at right angles to said rotor axis, a movable torsion fiber having a longitudinal axis and having negligible mechanical hysteresis, means connecting one end of said fiber to said gimbal ring, drive means, means connecting the other end of said fiber to said drive means and means for energizing said drive means to twist said fiber about its longitudinal axis to apply a torque to said gimbal ring.

2. A gyroscope assembly including in combination a gyroscope gimbal ring, a support, means for pivotally mounting said support for rotation about an axis, means for mounting said gimbal ring on said support for movement about an axis at right angles to said support rotation axis and around which a correcting torque is to be applied, a torsion fiber connected at one end to said gimbal ring, drive means connected to the other end of said fiber for twisting said fiber to apply a torque to said gimbal ring, means for producing a digital representation of the motion of said drive means, means for comparing said digital representation of said drive means motion with a digital representation of a desired torque to produce an error signal and means responsive to said error signal for controlling said drive means.

3. A gyroscope assembly as in claim 2 in which said gimbal ring is floated.

4. A gyroscope assembly as in claim 2 in which the means for producing a digital representation of said drive means motion comprises an analogue-to-digital converter having an input shaft and means responsive to said drive means for driving said input shaft.

5. A gyroscope assembly as in claim 2 in which said gimbal ring mounting means comprises a pair of stub shafts, said torsion fiber being connected to one of said stub shafts and including a second torsion fiber connected between the other stub shaft and said support.

6. A gyroscope assembly as in claim 2 in which said torsion fiber is formed of quartz and is of predetermined dimensions.

7. A gyroscope assembly as in claim 2 in which said fiber is formed of quartz and respective lengths of larger diameter quartz rod fused to the ends of the fiber.

8. A gyroscope assembly as in claim 2 including a second torsion fiber connected between said gimbal ring and said support, said fibers having axes lying substantially along the axis of rotation of said gimbal ring.

9. A gyroscope assembly including in combination a rotor, a gimbal ring supporting said rotor for movement about the rotor axis, a support, means mounting said gimbal ring on said support for movement about an axis at right angles to said rotor axis, a movable torsion fiber, means connecting one end of said fiber to said gimbal ring, drive means comprising means for producing a digital representation of the motion of said drive means, means for comparing said digital representation of the motion of the drive means with a digital representation of a desired torque to produce an error signal representative of the difference between the actual torque and the desired torque, means responsive to said error signal for controlling said drive means, means connecting the other end of said fiber to said drive means and means for energizing said drive means to twist said fiber to apply a torque to said gimbal ring.

10. A gyroscope assembly including in combination a rotor, a gimbal ring supporting said rotor for movement about the rotor axis, a support, means for mounting said gimbal ring on said support for movement about an axis at right angles to said rotor axis, a movable torsion fiber formed of quartz, means connecting one end of said fiber to said gimbal ring, drive means, means connecting the other end of said fiber to said drive means and means for energizing said drive means to twist said fiber to apply a torque to said gimbal ring.

References Cited in the file of this patent
UNITED STATES PATENTS

| | | |
|---|---|---|
| 1,628,136 | Ford | May 10, 1927 |
| 1,685,762 | Sparling | Sept. 25, 1928 |
| 2,504,170 | Wong | Apr. 18, 1950 |
| 2,704,456 | Hammond | Mar. 22, 1955 |
| 2,752,684 | Bently | July 3, 1956 |
| 2,795,143 | Hammond | June 11, 1957 |
| 2,839,930 | Hayner | June 24, 1958 |